United States Patent [19]
Janetzke et al.

[11] Patent Number: 5,419,186
[45] Date of Patent: May 30, 1995

[54] METHOD AND ARRANGEMENT FOR CHECKING THE OPERATION OF AN ACTUATOR IN A MOTOR VEHICLE

[75] Inventors: Helmut Janetzke, Hemmingen; Rudi Mayer, Vaihingen/Enz, both of Germany

[73] Assignee: Robert Bosch GmbH, Stuttgart, Germany

[21] Appl. No.: 80,292

[22] Filed: Jun. 21, 1993

[30] Foreign Application Priority Data

Jun. 20, 1992 [DE] Germany .................. 42 20 286.8

[51] Int. Cl.[6] .......................................... G01M 15/00
[52] U.S. Cl. ................................................. 73/118.1
[58] Field of Search .......................... 73/118.1, 119 A

[56] References Cited

U.S. PATENT DOCUMENTS

| | | |
|---|---|---|
| 4,339,801 | 7/1982 | Hosaka et al. . |
| 4,601,199 | 7/1986 | Denz . |
| 4,697,563 | 10/1987 | Becker et al. . |
| 4,794,790 | 1/1989 | Margarit-Metaxa et al. . |
| 5,031,595 | 7/1991 | Heck et al. .................. 73/118.1 |

Primary Examiner—Robert Raevis
Attorney, Agent, or Firm—Walter Ottesen

[57] ABSTRACT

The invention is directed to a method and an arrangement for checking the operability of an actuator for the air supply and especially in combination with an idle control. By a retard shift of the ignition time point, the operability of the actuator is determined when the engine speed remains essentially constant and the engine load increases.

9 Claims, 2 Drawing Sheets

5,419,186

METHOD AND ARRANGEMENT FOR CHECKING THE OPERATION OF AN ACTUATOR IN A MOTOR VEHICLE

BACKGROUND OF THE INVENTION

U.S. Pat. No. 4,601,199 discloses a method and arrangement for checking the operation of an actuator in a motor vehicle. In this method and arrangement, the actuator is driven in a pregiven manner in predetermined operating states and especially during overrun operation of the internal combustion engine and a variable is detected and observed. The variable is connected indirectly to the change of the drive of the actuator. A correct function of the actuator or of the electronic system connected thereto is assumed when a pregiven relationship exists between the particular drive change and the change of the detected variable.

This procedure cannot be applied when the pregiven operating condition, that is the overrun operation, is not present for the checking operation.

SUMMARY OF THE INVENTION

In view of the above, it is an object of the invention to provide a method and an arrangement for checking the operation of an actuator in a motor vehicle wherein special operating phases must not be used and wherein the check of operation nonetheless can be carried out without a disadvantageous influence on the operating performance of the vehicle and without disturbances affecting the driver.

U.S. Pat. No. 4,794,790 discloses supplying more or less air quantities by appropriately driving the internal combustion engine for checking an idle actuator during operation of the engine. A conclusion as to the operational capability of the idle actuator or of the hardware chain of the idle control corresponding thereto is drawn by observing the feedback of engine speed changes or air quantity changes which result. This procedure can lead to a disadvantageous influence on the operating performance of the motor vehicle and to disturbances affecting the driver.

U.S. Pat. No. 4,339,801 discloses other operational checks of sensors, sensor signals as well as computer elements in combination with control systems of motor vehicles.

U.S. Pat. No. 4,697,563 discloses measures with respect to the shift of the ignition time point (ignition angle) independently of the operating variables usually determining the ignition time point.

The procedure provided by the invention ensures that the check of the operation of an actuator or of an electronic system corresponding to the actuator takes place without influencing the operating performance of the motor vehicle.

The check of operation can be made even during operation of the electronic system without additional complexity.

The application of the procedure provided by the invention is especially advantageous for checking the operation of an idle actuator or the idle control associated therewith.

It is most advantageous to shift the ignition in the retard direction during the test phase in idle operation and to observe via the normal operation of the idle control the following: maintenance of constant engine speed, increase of engine load such as the fuel quantity to be metered, the supply of air and/or the intake pressure and, pursuant to a further embodiment, the increase of the drive signal magnitude for the actuator.

It is possible to draw a conclusion as to the operability of the idle actuator itself without detecting the drive signal variable. This is done in connection with other monitoring methods and methods for checking operation together with electronically controlled systems for motor vehicles.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
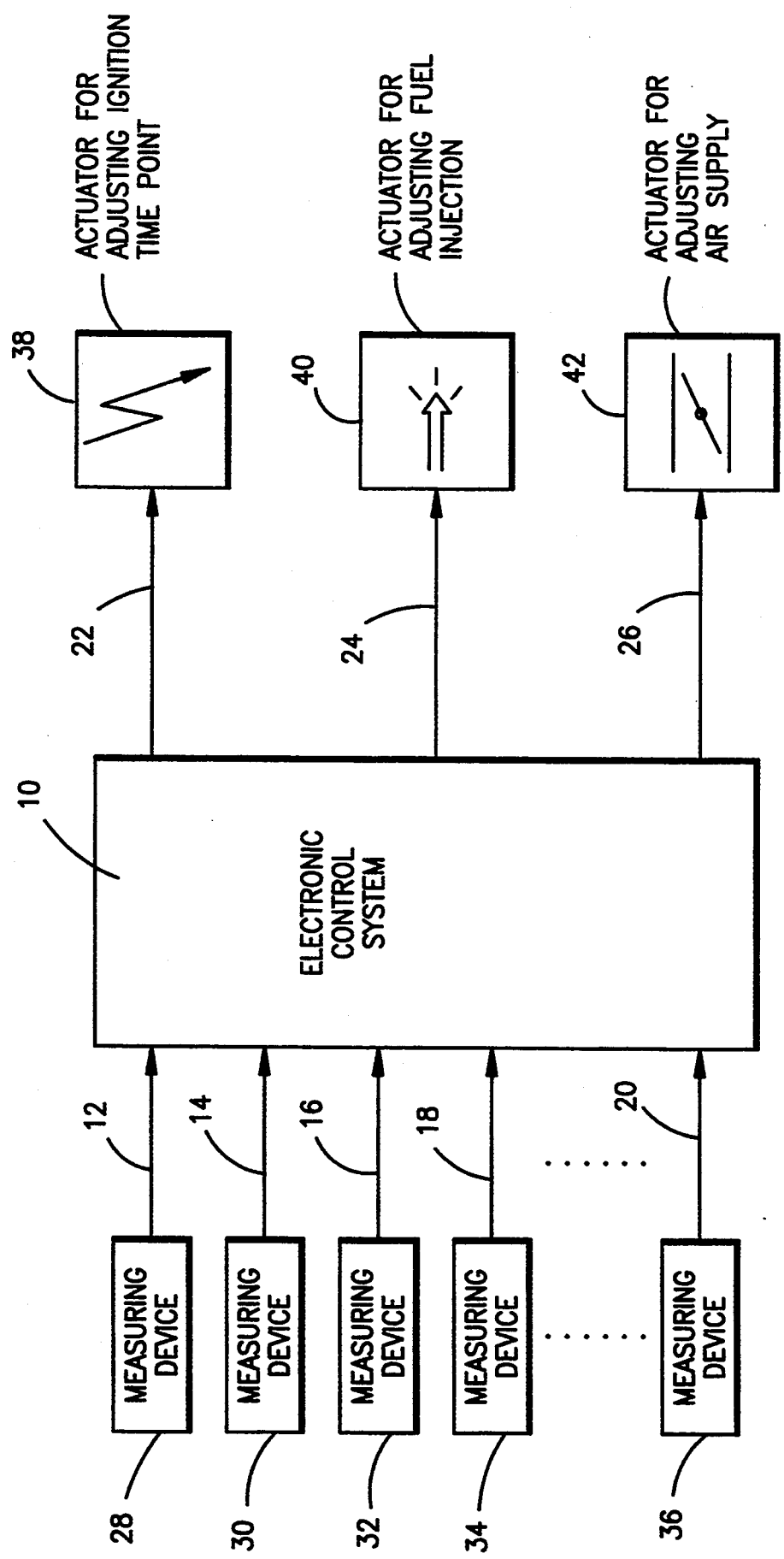
FIG. 1 is a block schematic diagram of an electronic system for controlling the power of an internal combustion engine; and, FIG. 2 is a flowchart for carrying out the method of the invention in the context of a program of a computer.

FIG. 1 shows an electronic control system 10 for an internal combustion engine (not shown). The electronic control system 10 includes essentially at least one computer element. Input lines 12, 14 and 16 as well as 18 to 20 are connected to the electronic control system 10. The control system 10 has at least the output lines 22, 24 and 26.

The input line 12 connects the electronic system to a measuring device 28 for the engine speed and the input line 14 connects the control system 10 to a measuring device 30 which detects a quantity representative of the load on the engine. The input line 16 connects the control system 10 to at least one measuring device 32 for detecting the exhaust gas composition; whereas, the input lines 18 to 20 connect the control system 10 to additional measuring devices 34 to 36, respectively, for detecting additional operating variables (described below) of the internal combustion engine and/or of the motor vehicle.

The output line 22 interconnects the electronic control system 10 and the adjusting means 38 for the ignition time point of the engine; whereas, the output line 24 connects control system 10 to a means 40 for injecting fuel and the third output line 26 leads to an actuator 42 for influencing the air supplied to the internal combustion engine.

In another advantageous embodiment, the drive signal variable of the actuator 42 is detected by one of the measuring devices 34 to 36.

The electronic control system 10 controls the ignition time point, the fuel quantity to be metered and, at least in idle, the air to be supplied to the engine with this control by the control system 10 being dependent upon its input variables. An idle control is provided which generates a drive signal in dependence upon a desired value formed from operating variables and the actual value of the engine speed detected by the measuring device 28 with this drive signal being generated via a pregiven control strategy (for example, PID: proportional controller, integral controller and differential controller). The drive signal actuates the actuator 42 via the line 26 with this actuator 42 being actuated to provide an adjustment in the direction which causes the actual value to approximate the desired value of the engine speed. The engine speed desired value is preferably computed from variables detected by the measuring devices 34 to 36. These variables can include engine temperature, road speed, battery voltage, transmission position, type of transmission and/or status of the climate control. The drive value for the fuel device 40 is computed in a known manner from engine speed and load signal value while considering the measured value for the exhaust gas composition. Likewise, the determination of the ignition time point takes place in a manner essentially known on the basis of engine speed and load signal by means of a characteristic field.

Furthermore, other functions can be carried out in the context of the electronic control system 10 which are not described here in greater detail. They include, for example, an electronic gas pedal system, a drive slip control, a road speed control, the control of an electronic transmission, an exhaust gas feedback control et, cetera.

In addition, the electronic control system 10 includes measures for monitoring the measuring devices, their signals and the computer element itself as well as the means for driving the actuators 38 to 42.

The drive signal variable of the actuator 42 is preferably the pulse duty factor of the drive pulse signal or, in other advantageous embodiments, a derived current value or voltage value.

Figure 2:
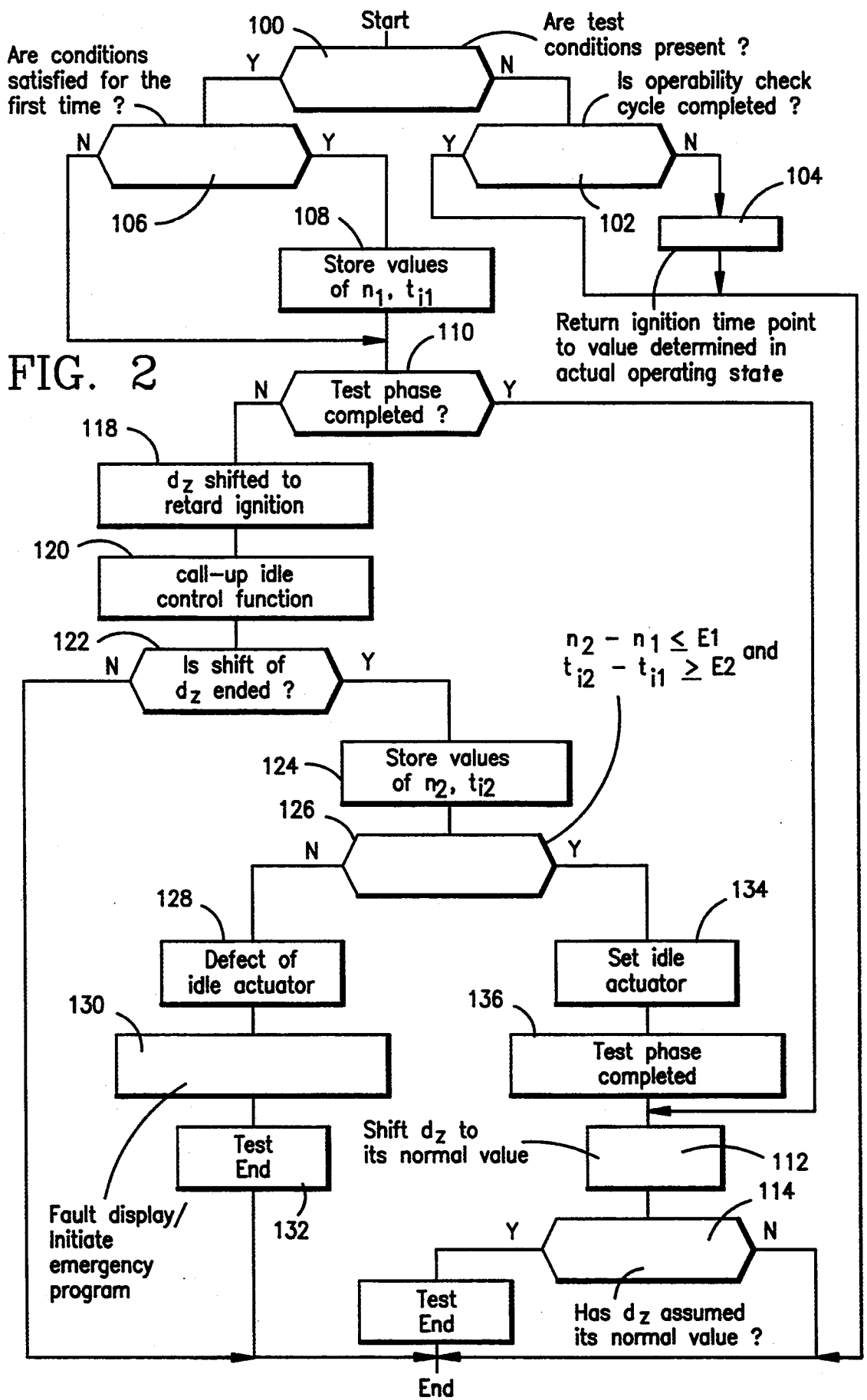

The check of operation described below is shown in the context of a preferred embodiment with respect to an actuator for adjusting the supply of air, an idle actuator and the idle control system corresponding thereto with reference being made to the flowchart of FIG. 2.

In other advantageous embodiments, the procedure described can also be applied in combination with other actuators influencing the supply of air such as an actuator of an electronic gas pedal system or, in the case of a diesel engine, the actuator influencing the metering of fuel and with respect to the particular open-loop and closed-loop control system corresponding thereto.

After calling up the subprogram, a check is made in a first inquiry step 100 as to whether the conditions are present which are pregiven for carrying out the check of operation. These conditions comprise essentially the following: that a pregiven time duration has elapsed or a pregiven operating duration has been reached or a pregiven mileage of the motor vehicle is reached since the last check of operation was carried out. Furthermore, the motor vehicle or its engine is in an operating state wherein the idle control is active in its normal function and/or the system indicates no other faults. This means, for example, the check as to operability is not carried out, for example, during overrun operation while the fuel is cut off or in the start phase of the internal combustion engine.

If the test condition according to step 100 is not present, then a check is made in the next inquiry step 102, for example on the basis of a set mark, as to whether an operability check cycle has been completed. If this is the case, then the subprogram is ended and called up anew after a pregiven time duration. If a check cycle is not completed, then this means that a change of the criteria forming the conditions for checking operability has taken place during the run-through of a check as to operability, for example, by a sudden acceleration of the motor vehicle. According to step 104, the ignition time point, which is influenced in the manner described below, is then immediately returned to the value determined by the actual operating state. Thereafter, the subprogram is terminated.

If it had been determined in step 100, that the conditions for carrying out a check as to operability are present, then a check is made in the next inquiry step 106, for example on the basis of a set mark, as to whether a test phase is initiated, that is, whether the conditions for carrying out the check of operability according to step 100 are satisfied for the first time for the test phase now initiated. If this is the case, then in step 108, a measure for the instantaneous engine speed $n_1$, which is a measure for the instantaneous engine torque $t_{i1}$, is stored. In another advantageous embodiment, a measure for the drive signal variable $S_1$ for the actuator is stored in addition. If the test phase is already initiated in one of the previous program run-throughs, then the program continues directly with step 110 while avoiding step 108.

In step 110, a check is made, for example with respect to a set mark, whether the actual test phase has already been completed. If this is the case, then, in step 112, the ignition time point, which was shifted during the test phase in the retard direction, is again shifted in the direction of its normal value, that is, the ignition time point is shifted in the advance direction. This "advance shift" according to step 112, takes place in the context of a pregiven time function in pregiven steps in order to avoid influencing the operating performance of the motor vehicle. These steps are selected so that the power change of the engine takes place slowly with this power change being initiated by the shift of the ignition time point. In this way, effects on the idle controller are absorbed. This can also be seen in the context that the ignition time point shift possibly has effects on the exhaust gas composition so that the shift should take place so slowly that the exhaust gas control can compensate for these effects. Inquiry step 114 follows step 112 and a check is made in step 114 as to whether the ignition time point has assumed its normal value defined by the operating variables present at that instant. If this is the case, then the mark is set in step 116 that the operational check is terminated and the subprogram is ended.

If the inquiry in step 110 came to the result that the actual test phase was not completed, then the program would continue with step 118.

The steps which follow step 118 define the actual test phase wherein values of detected reaction of the idle speed control are set into relationship with each other and, from the results, the operability of the idle control system and especially the idle speed actuator can be determined. The values are those for the retard shift of the ignition and those for the correct function.

In step 118, the ignition time point is shifted in accordance with a pregiven function and especially in accordance with a time-dependent linear ramp. This can take place, for example, in that a specific change quantity is added to the adjusted ignition time point in each program run-through. In the next step 120, the idle control function is called up and an output signal for driving the idle actuator (while increasing the drive signal quantity) is generated in dependence upon the difference between desired and actual values of the engine speed in accordance with a pregiven control strategy. These measures are combined in step 120. After executing the idle control step, a check is made in step 122 as to whether the ignition time point shift is ended. This takes place advantageously with the aid of a comparison of the present ignition time point to a limit value which may not be exceeded or a limit value below which there cannot be a drop. If this is not the case, then the subprogram is repeated and the ignition is again shifted in the retard direction.

In the opposite case, when the retard shift of the ignition has been ended, a measure for the engine speed $n_2$ then present and a measure for the engine load $t_{l2}$ are stored in accordance with step 124 and are evaluated in inquiry step 126 which follows step 124. In another advantageous embodiment, a measure for the drive signal quantity $S_2$ is stored which is present at this time point.

In inquiry step 126, a check is made as to whether the difference between the engine speed value $n_2$ at the end of the ignition time point shift and the engine speed value $n_1$ before the start of the ignition time point shift lies within a pregiven tolerance band. This means that a check is made as to whether the engine speed has remained essentially constant notwithstanding shifting of the ignition time point. In addition, and in accordance with inquiry step 127, the condition must be satisfied that the engine load value has become greater. This is checked, for example, in that the difference between the load value at the end of the time point shift $t_{l2}$ and the load value in advance of the start of the time point shift $t_{l1}$ is greater than a pregiven threshold value. In an advantageous embodiment, a further check is made as to whether the value of the drive signal value $S_2$ after ending the ignition shift, is greater than the value of the drive signal quantity $S_1$ in advance of the start of the shift.

This ensures that the evaluation of the check takes place only when the idle control is functioning correctly.

If one of the conditions with respect to load and engine speed is not satisfied, then, in accordance with step 128, a conclusion is drawn as to a defect of the idle actuator and in step 130, a fault display and, if necessary, an emergency program is initiated. The end of the functional check is determined in step 132. Thereafter, the subprogram is ended.

If the conditions in step 126 are satisfied, then the idle actuator is set in step 134 and, in the following step 136, the mark is set that the actual test phase is completed. Thereafter, the program continues in accordance with steps 112 to 116 and the ignition time point is brought to the value optimally determined by the operating variables.

In a preferred embodiment, the injection pulse duration generated from engine speed and air quantity or air mass is used as the engine load signal. In other embodiments, it can, however, be advantageous to use as the load signal the following: a measure of the supplied air quantity, the air mass, the throttle flap position and/or a measure of the intake pipe underpressure.

As an alternative to the procedure described above, a shift of the ignition time point in the advance direction can be taken into consideration in another embodiment of the invention. The sign of the inquiry in step 126 is then correspondingly changed with reference to the load signal.

A check of the actuator device for an electronic gas pedal system is likewise obtained advantageously in this manner.

It is further noted that the check of operation can take place in an advantageous manner not only during idle but also in other operating phases such as when the accelerator pedal is actuated at constant position.

A change in the exhaust gas composition occurs because of the manipulation of the ignition time point. For this reason, in systems presently known, the change of the exhaust gas composition is compensated by influencing the fuel metering, that is, the load signal. Accordingly, retarding the ignition time point in this manner must be dimensioned such that the change of the exhaust gas composition achieved in this way does not lead to a change in the load signal quantity in that the load signal quantity at the end of the time point shift is the same as before the start of the time point shift.

In addition to a time-dependent linear ramp for retard shift of the ignition, another time function can be applied in an advantageous manner, for example, an exponential function or any other nonlinear time function. It is advantageous to select essentially the same time function for return shifting the ignition time point. In other embodiments, however, it can also be advantageous to configure the "advance shift" of the ignition time point essentially faster than the retard shift. The limit in this connection is that, by influencing the ignition time point, a negative influencing of the operational performance of the internal combustion engine cannot be permitted to be a consequence thereof.

If the test conditions are not adhered to during a test phase, for example because of a sudden acceleration of the motor vehicle, then it is advantageous to set the ignition time point to the value determined by the then present operating variables in a jump-like manner or with a ramp having an appropriately greater slope.

A shift of the ignition angle has the same significance as the shift of the ignition time point described above.

In other embodiments, it can be advantageous, in lieu of intervening with respect to the ignition, to make an appropriate intervention with respect to fuel metering in the same sense with respect to engine power or an intervention in the air supply for checking a fuel metering element.

It is further advantageous to carry out the procedure described above by means of a separate diagnostic apparatus.

In lieu of the idle speed control, in other advantageous embodiments, a control of one of the following can be made: the air supply itself, a torque control, a control of the road speed, a control of the output rpm or the wheel rpm, a control of the engine speed, et cetera (as an open-loop or closed-loop control function). These controls react when influencing the engine speed by adjusting the actuator to be checked.

It is understood that the foregoing description is that of the preferred embodiments of the invention and that various changes and modifications may be made thereto without departing from the spirit and scope of the invention as defined in the appended claims.

What is claimed is:

1. A method of checking the operability of a first actuator device of an internal combustion engine of a motor vehicle, the first actuator device being provided for adjusting the power of the engine and the engine having a second actuator device for adjusting the ignition angle of the engine, the method comprising the steps of:

allowing said first actuator device to be driven via a control system in accordance with at least one pregiven control function so as to adjust the power of the engine;

detecting at least one operating variable of at least one of said engine and said motor vehicle which is affected by the adjustment of said power thereby causing said operating variable to define a course or trace as a function of time during operation of said engine and said motor vehicle;

adjusting said power of said engine by acting on said second actuator device to shift said ignition angle thereby changing an operating condition of said engine whereupon said control system responds to the changed operating condition by driving said first actuator device; and, monitoring said course of said one operating variable to determine a proper operation of said first actuator device when said first actuator device responds to said control system to compensate for the change in said operating condition or to detect a defective operation of said first actuator device from the performance of said course or trace of said one operating variable.

2. The method of claim 1, the method further comprising the step of shifting the ignition time point in accordance with a pregiven function.

3. The method of claim 2, wherein said one operating variable is a first operating variable which is indicative of the engine speed and wherein the method comprises the further step of detecting a second variable which is indicative of the engine load.

4. The method of claim 2, wherein the shift of the ignition angle is in a direction to retard ignition.

5. The method of claim 1, wherein said first actuator device is adapted to adjust the air supply to said engine; and, wherein said operating variable is a first variable indicative of engine speed and wherein the method comprises the further steps of:

detecting a second variable which is indicative of engine load;

shifting said ignition angle;

assuming the engine speed to be constant when the engine speed before the shift of the ignition angle corresponds essentially to the engine speed after the shift of said ignition angle; and, assuming an increase in the engine load when the measured value of the engine load before said shift is less than the engine load after said shift.

6. The method of claim 1, wherein said control system is allowed to run continuously while performing said method steps thereby making a switchoff of said control system unnecessary to detect said defective operation of said first actuator device.

7. The method of claim 6, wherein said method steps are performed during normal operation of said control system and said first actuator device whereby a separate test movement of said first actuator device is unnecessary.

8. A method of checking the operability of a first actuator device of an internal combustion engine of a motor vehicle, the first actuator device being provided for adjusting the power of the engine and the engine having a second actuator device for adjusting the ignition angle of the engine, the method comprising the steps of:

allowing said first actuator device to be driven via a control system in accordance with at least one pregiven control function so as to adjust the power of the engine;

detecting at least one operating variable of at least one of said engine and said motor vehicle which is affected by the adjustment of said power thereby causing said operating variable to define a course or trace as a function of time during operation of said engine and said motor vehicle;

adjusting said power of said engine by acting on said second actuator device to shift said ignition angle thereby changing an operating condition of said engine whereupon said control system responds to the changed operating condition by driving said first actuator device;

monitoring said course of said one operating variable to determine a proper operation of said first actuator device when said first actuator device responds to said control system to compensate for the change in said operating condition or to detect a defective operation of said first actuator device from the performance of said course or trace of said one operating variable; and, said first actuator device being adapted to respond to a drive signal from said control system and to influence the air supplied to the engine in the context of an idle speed control and wherein the method comprises the further step of determining the proper operation of said first actuator device when: the drive signal applied to said first actuator device becomes greater, the engine speed remains essentially constant, and the load on the engine increases, the determination of said proper operation of said first actuator device being made notwithstanding the shift of the ignition angle.

9. A method of checking the operability of a first actuator device of an internal combustion engine of a motor vehicle, the first actuator device being provided for adjusting the power of the engine and the engine having a second actuator device for adjusting the ignition angle of the engine, the method comprising the steps of:

allowing said first actuator device to be driven via a control system in accordance with at least one pregiven control function so as to adjust the power of the engine;

detecting at least one operating variable of at least one of said engine and said motor vehicle which is affected by the adjustment of said power thereby causing said operating variable to define a course or trace as a function of time during operation of said engine and said motor vehicle;

adjusting said power of said engine by acting on said second actuator device to shift said ignition angle thereby changing an operating condition of said engine whereupon said control system responds to the changed operating condition by driving said first actuator device;

monitoring said course of said one operating variable to determine a proper operation of said first actuator device when said first actuator device responds to said control system to compensate for the change in said operating condition or to detect a defective operation of said first actuator device from the performance of said course or trace of said one operating variable;

said first actuator device being adapted to adjust the air supply to said engine; and, said operating variable being a first variable indicative of engine speed; and, the method further including the steps of:

detecting a second variable which is indicative of engine load;

shifting said ignition angle;

assuming the engine speed to be constant when the engine speed before the shift of the ignition angle corresponds essentially to the engine speed after the shift of said ignition angle; and, assuming an increase in the engine load when the measured value of the engine load before said shift is less than the engine load after said shift; and, said monitoring taking place in the context of a test phase during active idle control.

* * * * *